(12) United States Patent
Hu et al.

(10) Patent No.: US 11,181,713 B2
(45) Date of Patent: Nov. 23, 2021

(54) CAMERA MODULE AND METHOD FOR CONTROLLING THE SAME

(71) Applicant: TDK TAIWAN CORP., Taoyuan (TW)

(72) Inventors: Chao-Chang Hu, Taoyuan (TW); Chen-Hsien Fan, Taoyuan (TW); Yi-Liang Chan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 200 days.

(21) Appl. No.: 16/531,715

(22) Filed: Aug. 5, 2019

(65) Prior Publication Data

US 2019/0353982 A1 Nov. 21, 2019

Related U.S. Application Data

(63) Continuation of application No. 15/470,490, filed on Mar. 27, 2017, now Pat. No. 10,416,532.

(Continued)

(30) Foreign Application Priority Data

Feb. 18, 2017 (TW) .................................. 106105425

(51) Int. Cl.
*G02B 7/04* (2021.01)
*G02B 27/64* (2006.01)
(Continued)

(52) U.S. Cl.
CPC .............. *G02B 7/04* (2013.01); *F03G 7/065* (2013.01); *G02B 7/08* (2013.01); *G02B 7/105* (2013.01);
(Continued)

(58) Field of Classification Search
CPC . G02B 7/04; G02B 7/08; G02B 7/105; G02B 27/64; G02B 27/646; F03G 7/065;
(Continued)

(56) References Cited

U.S. PATENT DOCUMENTS

2010/0074607 A1  3/2010 Topliss et al.
2015/0253583 A1  9/2015 Cho et al.
(Continued)

FOREIGN PATENT DOCUMENTS

CN   1677155 A   10/2005
CN   103576414 A   2/2014
(Continued)

OTHER PUBLICATIONS

An Examiner Report dated Jan. 13, 2020 corresponding India Application No. 20172401146, 5 pages.

(Continued)

*Primary Examiner* — Kristina M Deherrera
(74) *Attorney, Agent, or Firm* — Muncy, Geissler, Olds & Lowe, P.C.

(57) ABSTRACT

A camera module is provided, including a holder, a base, a bottom, an image sensor, and a first biasing element. The holder holds an optical lens and is disposed on the base. The bottom supports the image sensor and connects to the base via the first biasing element. The bottom and the image sensor can be moved with respect to the base by the first biasing element.

17 Claims, 12 Drawing Sheets

Related U.S. Application Data

(60) Provisional application No. 62/316,845, filed on Apr. 1, 2016.

(51) Int. Cl.
| | |
|---|---|
| *H04N 5/225* | (2006.01) |
| *G02B 7/08* | (2021.01) |
| *G03B 5/02* | (2021.01) |
| *F03G 7/06* | (2006.01) |
| *G02B 7/105* | (2021.01) |
| *G03B 3/02* | (2021.01) |
| *G03B 3/10* | (2021.01) |
| *G03B 5/04* | (2021.01) |
| *G03B 13/34* | (2021.01) |

(52) U.S. Cl.
CPC ............. *G02B 27/646* (2013.01); *G03B 3/02* (2013.01); *G03B 3/10* (2013.01); *G03B 5/02* (2013.01); *G03B 5/04* (2013.01); *G03B 13/34* (2013.01); *H04N 5/2253* (2013.01); *H04N 5/2254* (2013.01); *G03B 2205/0007* (2013.01); *G03B 2205/0076* (2013.01)

(58) Field of Classification Search
CPC ... G03B 3/02; G03B 3/10; G03B 5/02; G03B 5/04; G03B 13/34; G03B 2205/0007; G03B 2205/0076; H04N 5/2253; H04N 5/2254
USPC .......... 359/823, 554–557; 348/208.4–208.11
See application file for complete search history.

(56) References Cited

U.S. PATENT DOCUMENTS

| | | |
|---|---|---|
| 2016/0330375 A1 | 11/2016 | Sekimoto |
| 2017/0171440 A1 | 6/2017 | Park et al. |

FOREIGN PATENT DOCUMENTS

| | | |
|---|---|---|
| JP | 2002207148 A | 7/2002 |
| JP | 2007058075 A | 3/2007 |

OTHER PUBLICATIONS

An Office Action dated Dec. 4, 2017 in TW Application No. 106105425, which corresponds to the parent application, 4 pages, dated Dec. 8, 2017 on IDS in parent.

CAMERA MODULE AND METHOD FOR CONTROLLING THE SAME

CROSS REFERENCE TO RELATED APPLICATIONS

This application is a Continuation of application Ser. No. 15/470,490, filed on Mar. 27, 2017, which claims the benefit of U.S. Provisional Patent Application No. 62/316,845, filed on Apr. 1, 2016, and Taiwan Patent Application No. 106105425, filed on Feb. 18, 2017, the entirety of which is incorporated by reference herein.

BACKGROUND OF THE INVENTION

Field of the Invention

The application relates in general to a camera module, and in particular to a camera module provided with a biasing element for forcing an image sensor to move.

Description of the Related Art

Thanks to ongoing technological development, recent electronic devices (such as tablet computers and smartphones) usually include a lens module capable of aiding in photography or recording video. However, an image may come out blurry if the user shakes the lens module in the electronic device. To improve image quality, it is increasingly important to design a shockproof lens module.

BRIEF SUMMARY OF INVENTION

To address the deficiencies of conventional products, an embodiment of the invention provides a camera module including a base, a holder, an image sensor, a bottom, and a first biasing element. The holder is configured to hold an optical lens and connected to the base. The image sensor is disposed on the bottom. The first biasing element comprises a shape-memory alloy and connects to the bottom and the base, wherein the first biasing element forces the bottom and the image sensor to move relative to the base.

In some embodiments, the camera module further comprises a plurality of first biasing elements forcing the bottom and the image sensor to linearly move relative to the base.

In some embodiments, the base has a first central axis, the bottom has a second central axis, and the first biasing element forces the bottom and the image sensor to move relative to the base, so that the second central axis has an angular displacement relative to the first central axis.

In some embodiments, the first biasing element is situated between the base and the bottom.

In some embodiments, the camera module further comprises a first elastic element connected to the bottom and the base.

In some embodiments, the first elastic element is substantially perpendicular to an optical axis of the optical lens and has an outer section, an inner section, and a middle section, wherein the outer section and the inner section are respectively affixed to the base and the bottom, and the middle section connects the outer section to the inner section.

In some embodiments, the camera module further comprises a guiding member, and the base has a groove with the guiding member disposed therein, wherein the first biasing element is extended around the guiding member and has a U-shaped structure.

In some embodiments, the camera module further comprises a second biasing element, comprising a shape-memory alloy and connected to the holder and the base, wherein the second biasing element forces the holder and the optical lens to move relative to the base.

In some embodiments, the camera module further comprises a conductor formed on the base by insert molding or 3D molded interconnect device technology, wherein the conductor is electrically connected to the second biasing element.

In some embodiments, the second biasing element has a first section and a U-shaped second section, and the first section is substantially parallel to a first central axis of the base and connects to the second section.

In some embodiments, the second biasing element further has a third section substantially perpendicular to the first central axis, and the second section connects the first section to the third section, wherein the second section and the third section are situated on opposite sides of the first section.

In some embodiments, the camera module further comprises a second elastic element, and the base further has a stage portion and at least one protrusion, wherein the protrusion protrudes toward the holder from the stage portion, and the second elastic element connects the protrusion to the holder.

An embodiment of the invention provides a method for controlling the camera module, wherein the camera module further comprises a plurality of first biasing elements disposed between the base and the bottom, the method comprising applying a plurality of driving signals to the first biasing elements respectively to move the bottom, so that a second central axis of the bottom has an angular displacement relative to a first central axis of the base.

Another embodiment of the invention provides a method for controlling the camera module, wherein the camera module further comprises a plurality of second biasing elements disposed on different sides of the base, the method comprising: applying a plurality of driving signals to the second biasing elements respectively to move the holder, so that an optical axis of the optical lens has an angular displacement relative to a first central axis of the base.

Another embodiment of the invention provides a camera module comprising a base, a holder, a bottom, an image sensor, a frame, and a first biasing element. The base has a first central axis, and the holder is configured to hold an optical lens and is connected to the base. The bottom has a second central axis and affixed to a lower surface of the base. The image sensor is disposed on the bottom, and the frame has a third central axis and surrounds the base and the bottom. The first biasing element comprises a shape-memory alloy and connects to the bottom and the frame. When the first biasing element deforms, the first biasing element forces the bottom, the image sensor, and the base to move together relative to the frame, and the first central axis and the second central axis have an angular displacement relative to the third central axis.

In some embodiments, a gap is formed between the frame and the base.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the camera modules are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
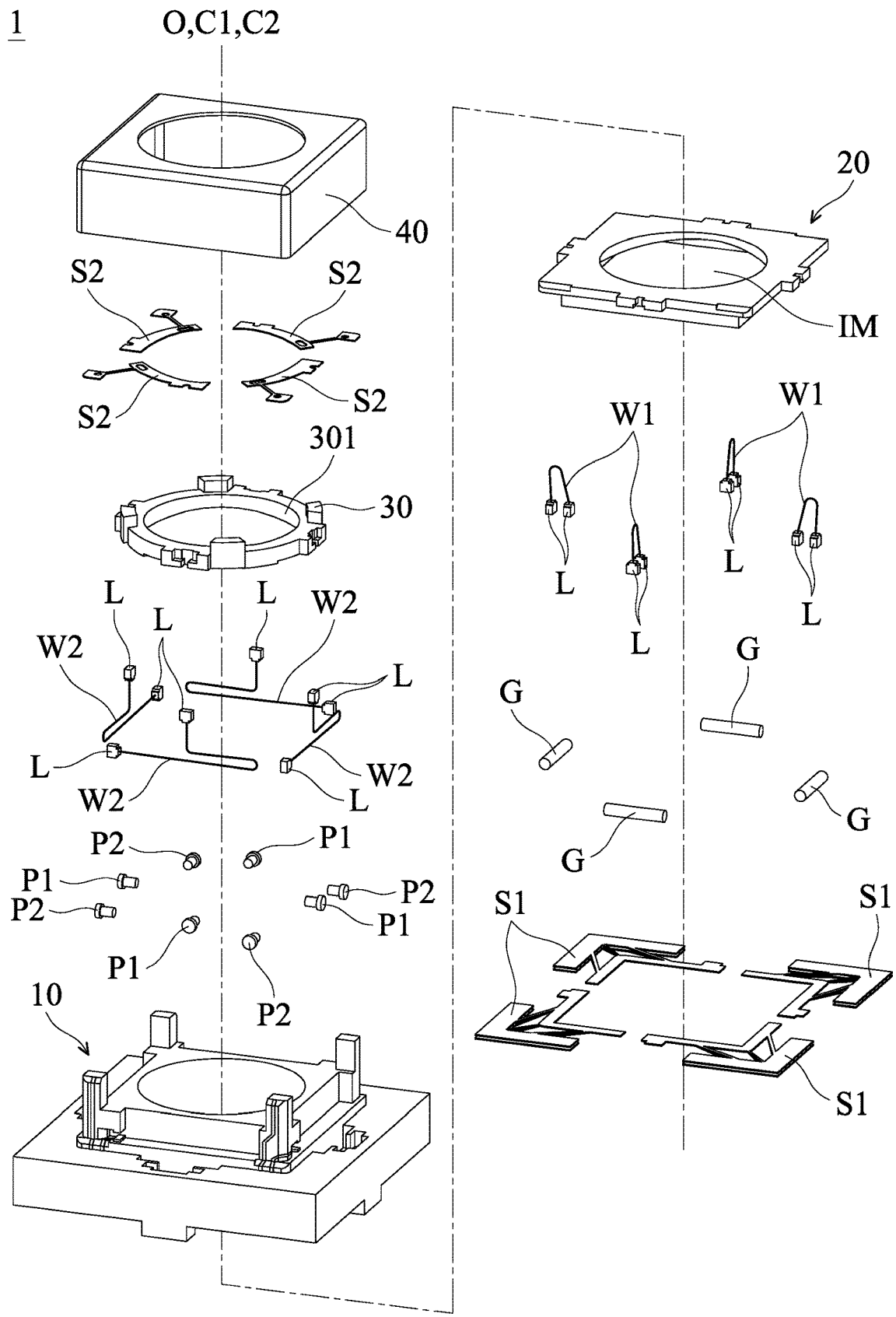
FIG. 1 is an exploded diagram of a camera module according to an embodiment of the invention.
Figure 2A:
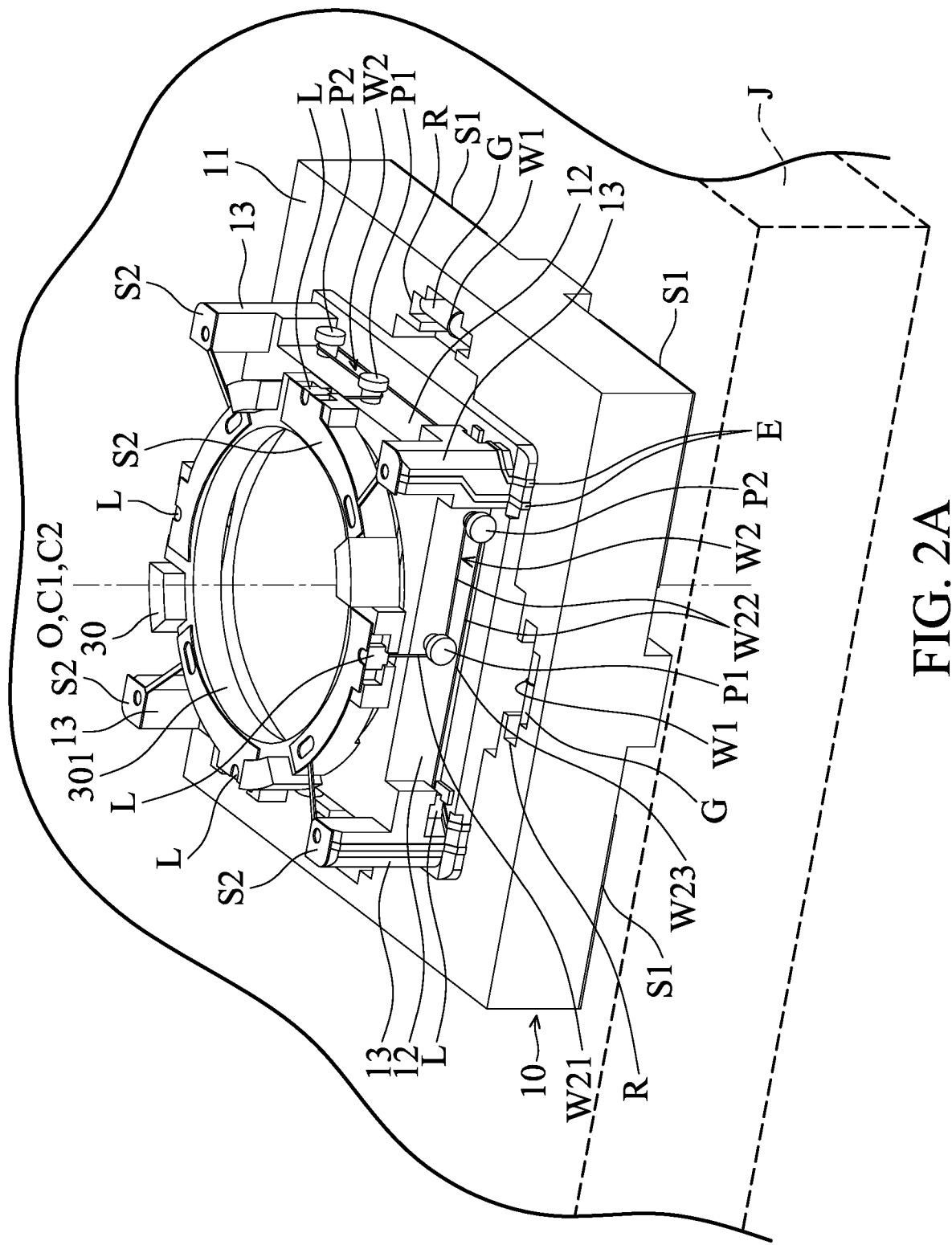
FIG. 2A is a schematic diagram of the camera module in FIG. 1 after assembly (the housing thereof is omitted)
Figure 2B:
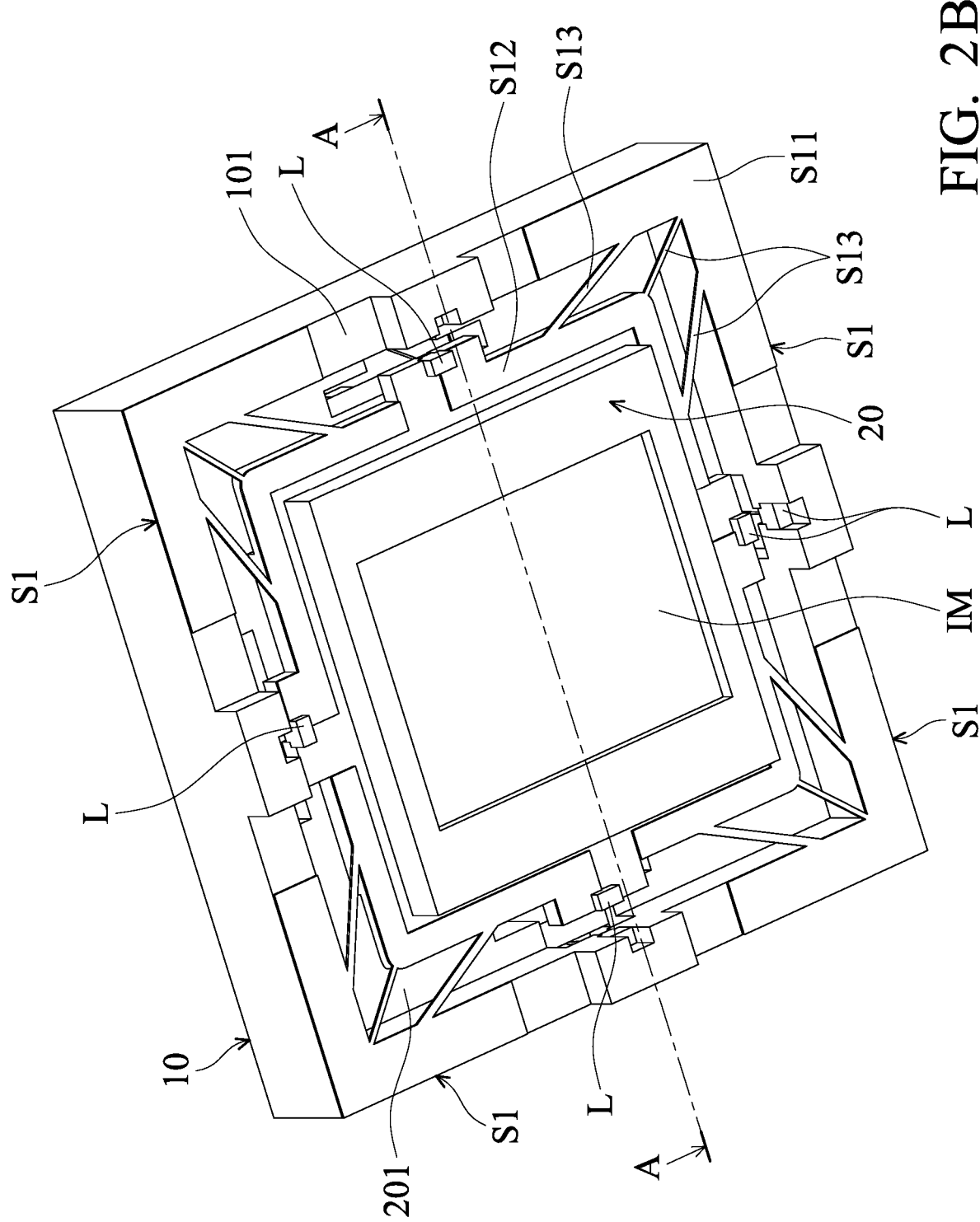
FIG. 2B is another perspective schematic diagram of the camera module (the housing thereof is omitted) in FIG. 2A.

FIG. 1 is an exploded-view diagram of a camera module 1 according to an embodiment of the invention, and FIGS. 2A-2B are schematic diagrams of the camera module 1 in FIG. 1 after assembly and a housing 40 thereof is omitted. The camera module 1 can be disposed in an electronic device J, such as a camera, a tablet computer, or a cell phone, and it can be configured with an optical lens (not shown) and an image sensor IM disposed therein. The optical lens and the image sensor are movable with respect to each other, so that the camera module 1 has an auto-focusing (AF) function and optical image stabilization (OIS).

As shown on FIGS. 1 and 2A-2B, the camera module 1 primarily comprises a base 10, a bottom 20, a holder 30, a housing 40, an image sensor IM, a plurality of first elastic elements S1, a plurality of first biasing elements W1, a plurality of second elastic elements S2, and a plurality of second biasing elements W2. The bottom 20 is disposed under the base 10 and can be configured with the image sensor IM. The holder 30 is disposed on the base 10 and can be configured with an optical lens (not shown). The image sensor IM is configured to receive light from the outside of the camera module 1 and through the optical lens so that an image is acquired. The connection between the base 10 and the bottom 20 is described below. The connection between the holder 30 and the base 10 will be described later.

The base 10 and the bottom 20 respectively have a first central axis C1 and a second central axis C2. In a normal condition, the first central axis C1 coincides with the second central axis C2. The first elastic elements S1 (such as metal springs) are connected to the base 10 and the bottom 20 and are substantially perpendicular to the optical axis O of the optical lens. In particular, each of the first elastic elements S1 has an outer section S11, an inner section S12, and a middle section S13 (as shown in FIG. 2B), wherein the inner and outer sections S11 and S12 are respectively affixed to a lower surface 101 of the base 10 and a lower surface 201 of the base 20. The middle section S13 connects to the outer and inner sections S11 and S12, so that the bottom 20 is movably connected to the base 10.

The first biasing elements W1, such as wires comprising a shape-memory alloy (SMA), are also connected to the base 10 and the bottom 20, and their lengths can be changed by applying one or more driving signals (e.g., electrical current) to them from an external power source. For example, when applying driving signals to heat the first biasing elements W1, the first biasing elements W1 are deformed (e.g., elongated or shortened). When the application of the driving signals is stopped, the deformed first biasing elements W1 will recover to their original lengths. In other words, by applying one or more appropriate driving signals, the lengths of the first biasing elements W1 can be controlled to alter the posture of the bottom 20. The first biasing elements W1, for example, may comprises a titanium-nickel (TiNi) alloy, a titanium-palladium (TiPd) alloy, a titanium-nickel (TiNiCu) alloy, a titanium-nickel-palladium (TiNiPd) alloy, or a combination thereof.

Figure 3:
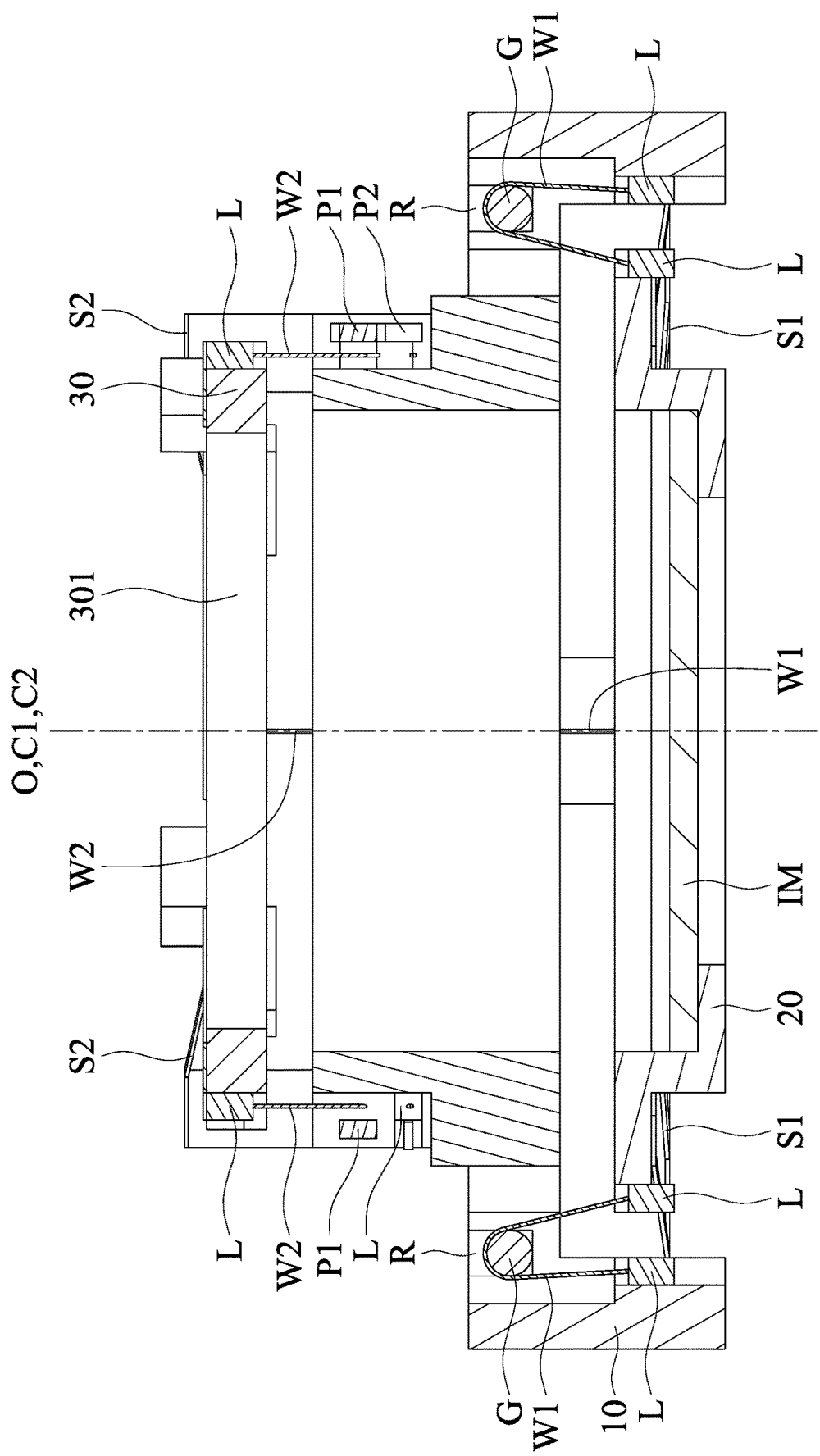
FIG. 3 is a sectional view diagram taken along line A-A in FIG. 2B.

Referring to FIGS. 2A-2B and 3, FIG. 3 is a sectional view diagram taken along line A-A in FIG. 2B. As shown in FIG. 2A, the base 10 has a substantially rectangular main body 11, four grooves R are respectively formed on four different sides of the upper surface of the main body 11, and four guiding members G (for example, cylinder rollers) are disposed in the grooves R, respectively. As shown in FIG. 3, the first biasing elements W1 are positioned between the base 10 and the bottom 20 in a direction that is perpendicular to the second central axis C2, and are respectively disposed around the guiding members G and have a U-shaped structure. Two conductive blocks L are electrically connected to two ends of each of the first biasing elements W1, and the conductive blocks L are affixed to the base 10 and the bottom plate 20, respectively (for example, they are affixed to the base 10 and the bottom 20 by an engaging means or an adhesive). Therefore, the first biasing elements W1 can be connected to the base 10 and the bottom 20, and when the external power source applies the drive signal to one or a plurality of first biasing elements W1 to deform, the posture of the bottom 20 can be adjusted, and the image sensor IM disposed on the bottom 20 is also moved or rotated with the bottom 20.

It should be noted that a plurality of conductive wires (not shown) can be formed on the base 10 and the bottom 20 by insert molding or 3D molded interconnect device (MID) technology and are electrically connected to the conductive blocks L. Thus, the four first biasing elements W1 form four respective independent circuits, whereby driving signals (e.g., current) can be supplied to them respectively from an external power source via the wires, and the lengths of the first biasing elements W1 can be changed to adjust the posture of the bottom 20, to achieve optical image stabilization (OIS).

It should be understood that each of the first biasing elements W1 is electrically independent and connects to an external power source. Thus, a plurality of different driving signals can be respectively supplied to the first biasing elements W1 by the external power source, and the first biasing elements W1 can be independently controlled to have different or the same length variations. For example, when applying driving signals to the first biasing elements W1, the first biasing elements W1 are deformed with different or the same length variations, so that the first biasing elements W1 can force the bottom 20 and the image sensor IM to linearly move along the first central axis C1 of the base 10 relative to the base 10, or force the bottom 20 and the image sensor IM to move so that the second central axis C2 of the bottom 20 has an angular displacement relative to the first central axis C1, to achieve optical image stabilization.

Figure 4:
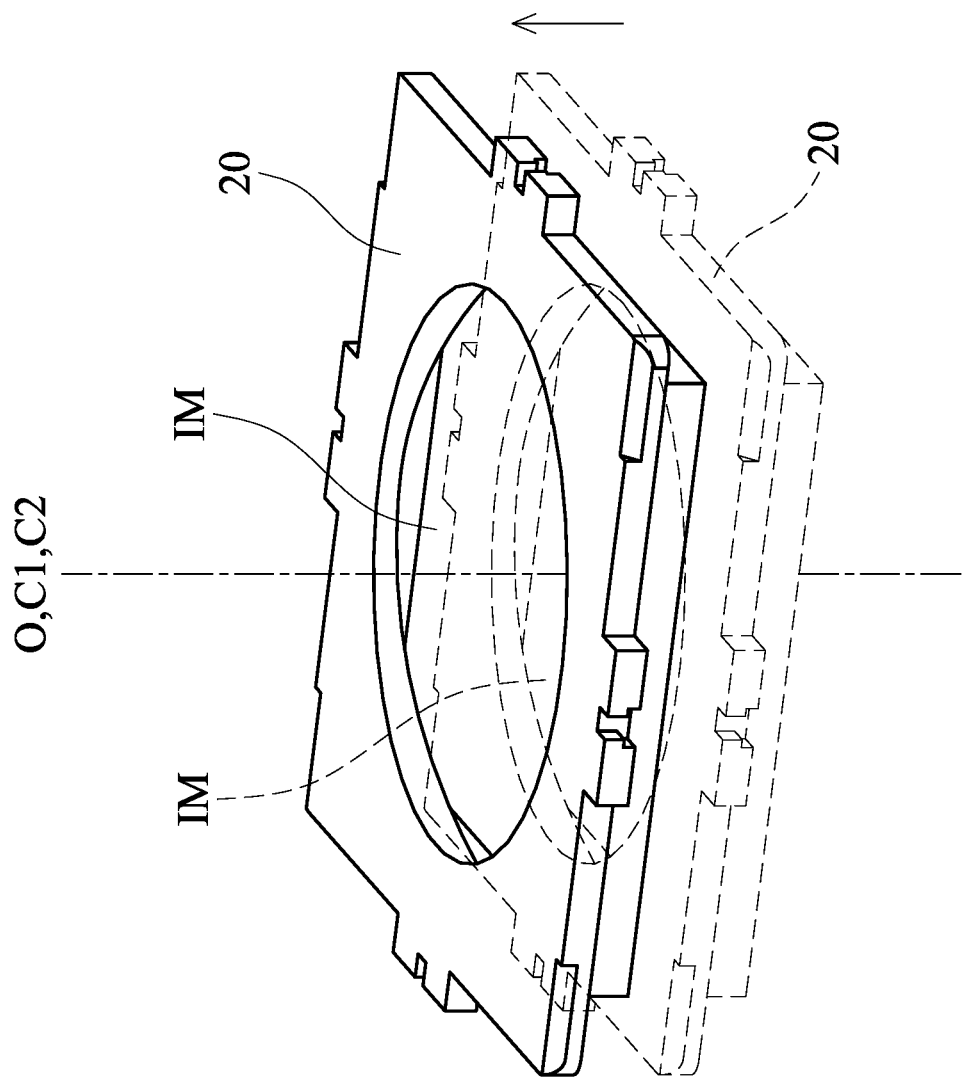
FIG. 4 is a schematic diagram of the bottom and the image sensor linearly moving along the direction of the first central axis.
Figure 5:
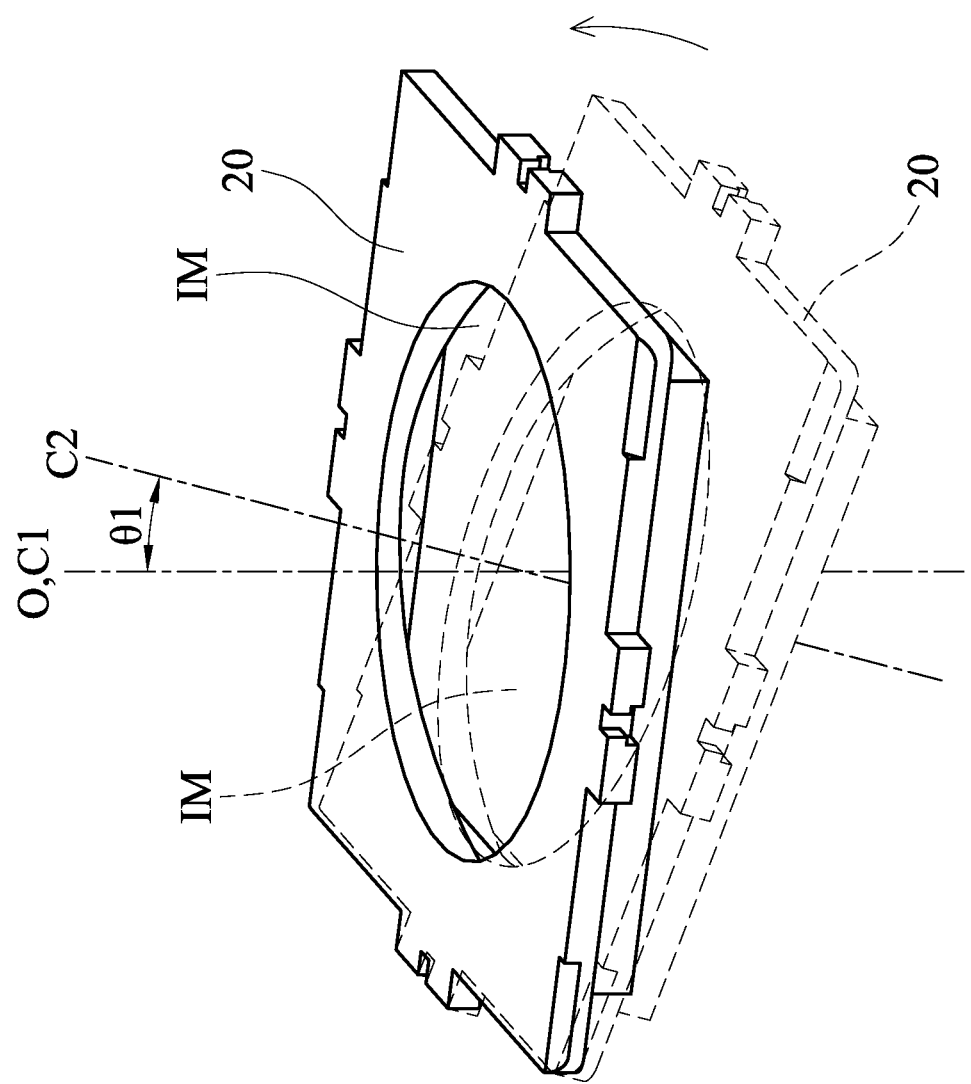
FIG. 5 is a schematic diagram of the second central axis having an angular displacement with respect to the first central axis.

Specifically, as shown in FIG. 4, when the driving signals are applied to the first biasing elements W1 disposed on the four sides of the main body 11 so that they have the same length variation, the first biasing elements W1 force the bottom 20 and the image sensor IM to move relative to the base 10 in the direction of the first central axis C1 and the optical axis O. When the driving signals are applied to the first biasing elements W1 so that they have different length variations, the second central axis C2 of the bottom 20 has an angular displacement θ1 (as shown in FIG. 5) with respect to the first central axis C1 of the base 10. In other words, by applying the driving signals and controlling the length variations of the first biasing elements W1, the image sensor IM can be moved or rotated to compensate for the shift caused by the shaking of the camera module 1, so that image quality can be enhanced.

Furthermore, since the bottom 20 and the base 10 are connected via the first elastic elements S1, when the drive signals have not yet been applied to the first biasing elements W1, the bottom 20 can be positioned at an initial position with respect to the base 10 by the first elastic elements S1.

The connection relationship between the base 10 and the holder 30 is described below. Please refer to FIGS. 1 and 2, the holder 30 is disposed on the base 10, and a receiving space 301 is extended through the holder 30, so that an optical lens (not shown) can be disposed therein. The base 10 further has a stage portion 12 with a substantially square or rectangular structure disposed on the main body 11 and four protrusions 13. The protrusions 13 are respectively disposed at the four corners of the stage portion 12 and protrude from the stage portion 12 toward the holder 30. The holder 30 connects to the four protrusions 13 of the base 10 by the four first elastic elements S1 (such as metal springs).

The second biasing elements W2 (which may comprise shape-memory alloy (SMA) material) also connect to the base 10 and the holder 30. Specifically, two columnar position members P1 and P2 are disposed on each side of the stage portion 12 of the base 10. As with the second biasing elements W2 at the bottom of FIG. 2A, the second biasing elements W2 are in contact with and extended around the position members P1 and P2. All the second biasing elements W2 can be divided into three sections: a first section W21, a second section W22, and a third section W23. The first section W21 is substantially parallel to the first central axis C1, and the second section W22 has a U-shaped structure and connects to the first section W21. The third section W23 is substantially perpendicular to the first central axis C1, wherein the second section W22 is connected to the first section W21 and the third section W23, and the second section W22 and the third section W23 are respectively situated at the left and right sides of the first section W21. As the second biasing elements W2 extend around the position members P1 and P2 to form the three sections W21, W22, and W23, the lengths of the second biasing elements W2 disposed on each side of the stage portion 12 can be increased. Therefore, when the second biasing elements W2 are deformed, more variation in length can be generated. Furthermore, due to the distance between the position members P1 and P2 in the direction of the first central axis C1, short-circuits between the first, second, and third sections W11, W12, and W13 can be avoided. Furthermore, as shown in FIGS. 1 and 3, the first biasing elements W1 and the second biasing elements W2 are situated in different positions in the direction of the first central axis C1.

Still referring to FIG. 2A, a plurality of conductors E (such as conductive wires) are formed on the base 10 (the protrusions 13 of the base 10) by insert molding or 3D molded interconnect device technology. The conductors E are electrically connected to the second elastic elements S2 and the second biasing elements W2, respectively, to form four independent circuits. As the deformation of the first biasing elements W1, driving signals (e.g., current) can be supplied to the second biasing elements W2 from an external power source, and the lengths of the second biasing elements W2 can be changed to adjust the posture of the holder 30. It should be noted that, since the second elastic elements S2 are electrically conductive (such as springs comprising metal), the second biasing elements W2 and the conductors E can be electrically connected to each other, so that no additional wires are required, saving space.

Figure 6:
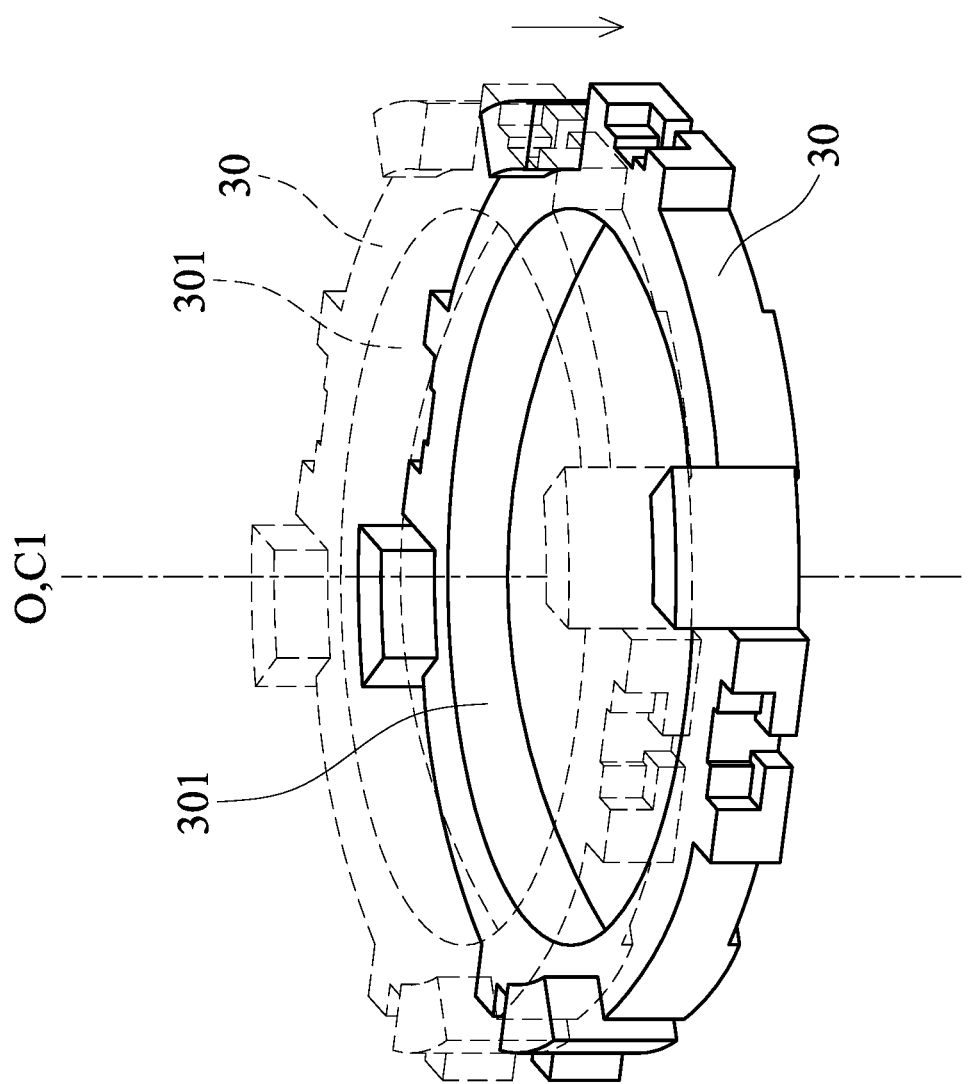
FIG. 6 is a schematic diagram of the holder linearly moving along the direction of the optical axis.
Figure 7:
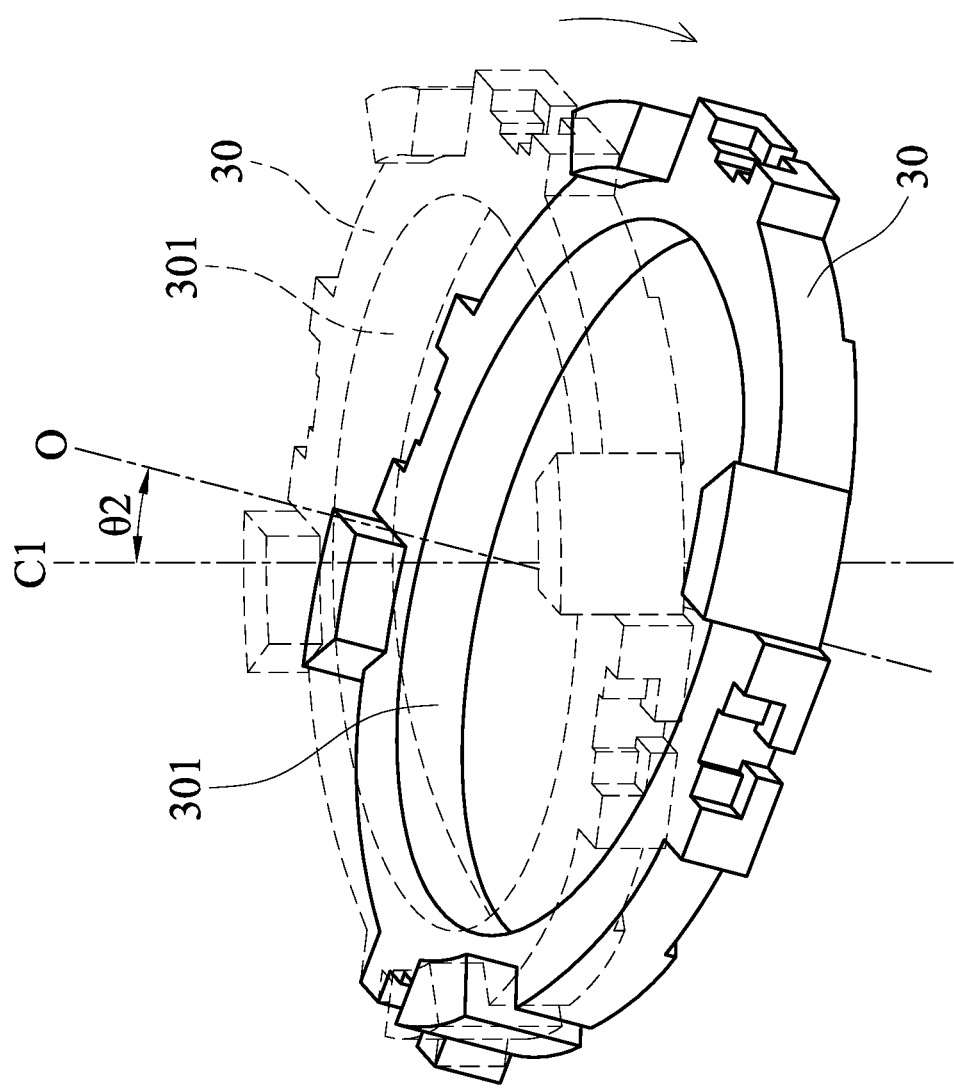
FIG. 7 is a schematic diagram of the optical axis having an angular displacement with respect to the first central axis.

It should be understood that, when applying driving signals to the second biasing elements W2, the second biasing elements W2 may deform and have length variations that are the same or different. Thus, the second biasing elements W2 can force the holder 30 and the optical lens to move in the direction of the optical axis O with respect to the base 10, or force the optical axis O to have an angular displacement relative to the first central axis C1 of the base 10, to achieve the function of fast optical focus or optical image stabilization (OIS). As shown in FIG. 6, when the driving signals are applied to the second biasing elements W2 on the four sides of the stage portion 12, if the length variations thereof are substantially the same, the second biasing elements W2 can force the holder 30 and the optical lens to move relative to the base 10 in the direction of the optical axis O. On the other hand, if the length variations thereof are different from each other, the holder 30 and the optical axis O of the optical lens can have an angular displacement θ2 relative to the first central axis C1 of the base 10 (as shown in FIG. 7).

As described above, by appropriately applying different drive signals to the first biasing elements W1 and the second biasing elements W2, the length variations can be appropriately controlled, so that: (1) the bottom 20 and the image sensor IM can move relative to the base 10, the holder 30 and the optical lens, and (2) the holder 30 and the optical lens can move relative to the base 10, thereby providing fast optical focus and optical image stabilization.

Furthermore, in another embodiment, the camera module 1 may have only one first biasing element W1 and one second biasing element W2. When a driving signal is applied to the first biasing element W1, the first biasing element W1 is deformed, and the second central axis C2 of the bottom 20 can be angularly shifted by an angular displacement θ1 relative to the first central axis C1 of the base 10; when a driving signal is applied to the second biasing element W2, the first biasing element W2 is deformed, and the optical axis O can be angularly shifted by an angular displacement θ2 relative to the first central axis C1, so that tilt angle compensation of the camera module 1 can be accomplished.

According to the foregoing embodiment, a method for controlling the camera module 1 is provided. One significant step of the method is to apply a plurality of drive signals to the first biasing elements W1 respectively to move the bottom 20 and the image sensor IM along the first central axis C1 or the optical axis O, or to move the bottom 20 and the image sensor IM so that the second central axis C2 of the bottom 20 relative to the first central axis C1 has an angular displacement θ1. Furthermore, the method comprises applying a plurality of driving signals to the respective second biasing elements W2, so that the holder 30 and the optical lens are moved in the direction of the optical axis O, or the optical axis O of the optical lens has an angular displacement θ2 with respect to the first central axis C1 of the base 10.

Figure 8:
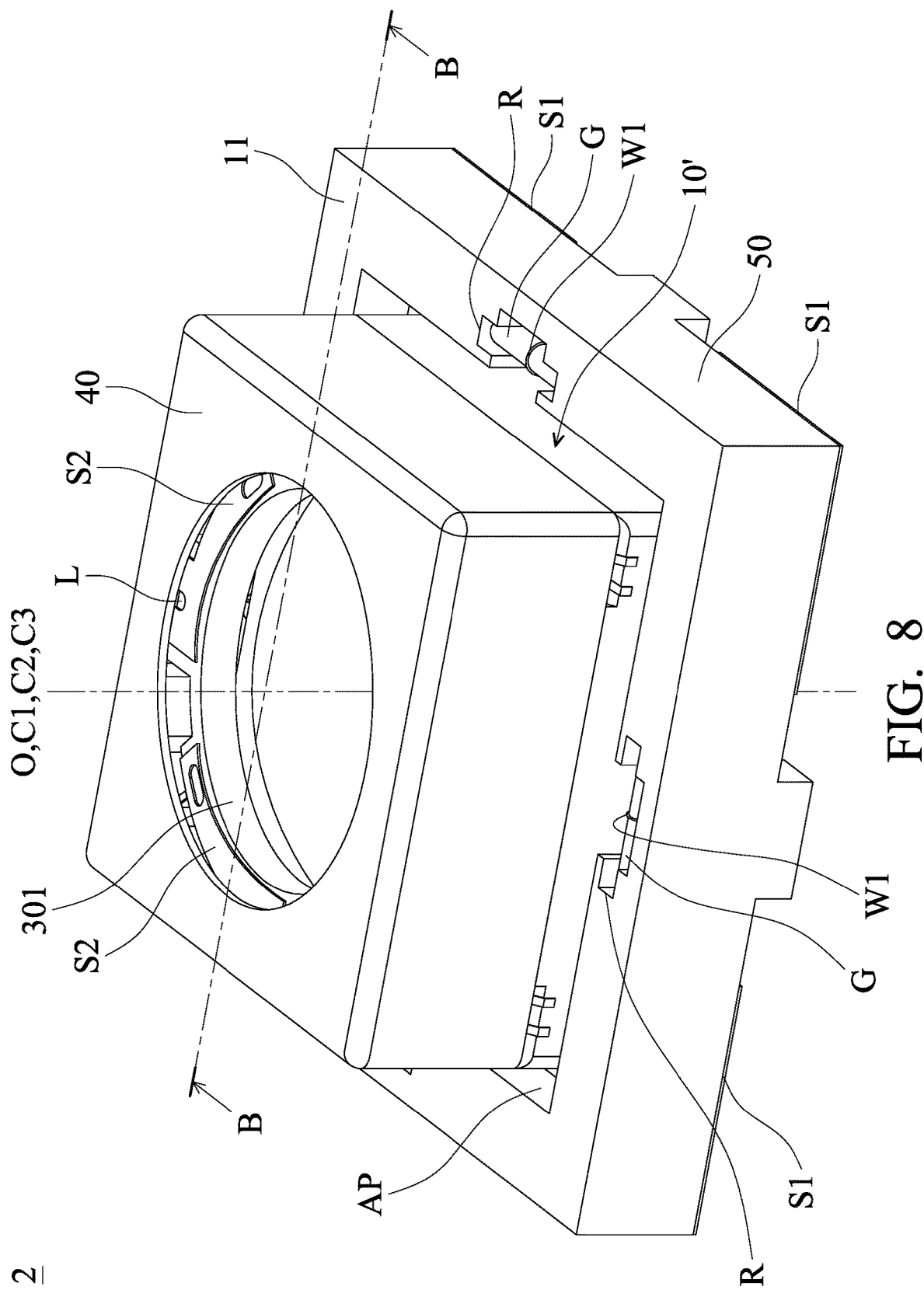
FIG. 8 is a schematic diagram of a camera module according to another embodiment of the invention.

FIG. 8 is a schematic diagram of a camera module 2 according to another embodiment of the invention. The main difference between the camera module 2 in the present embodiment and the camera module 1 in the aforementioned embodiment is that the base 10' of the camera module 2 is different from the base 10, and the camera module 2 further comprises a frame 50, wherein the same elements corresponding to the aforementioned embodiment (FIGS. 1 and 2A-2B) are not described again here in detail.

Figure 9:
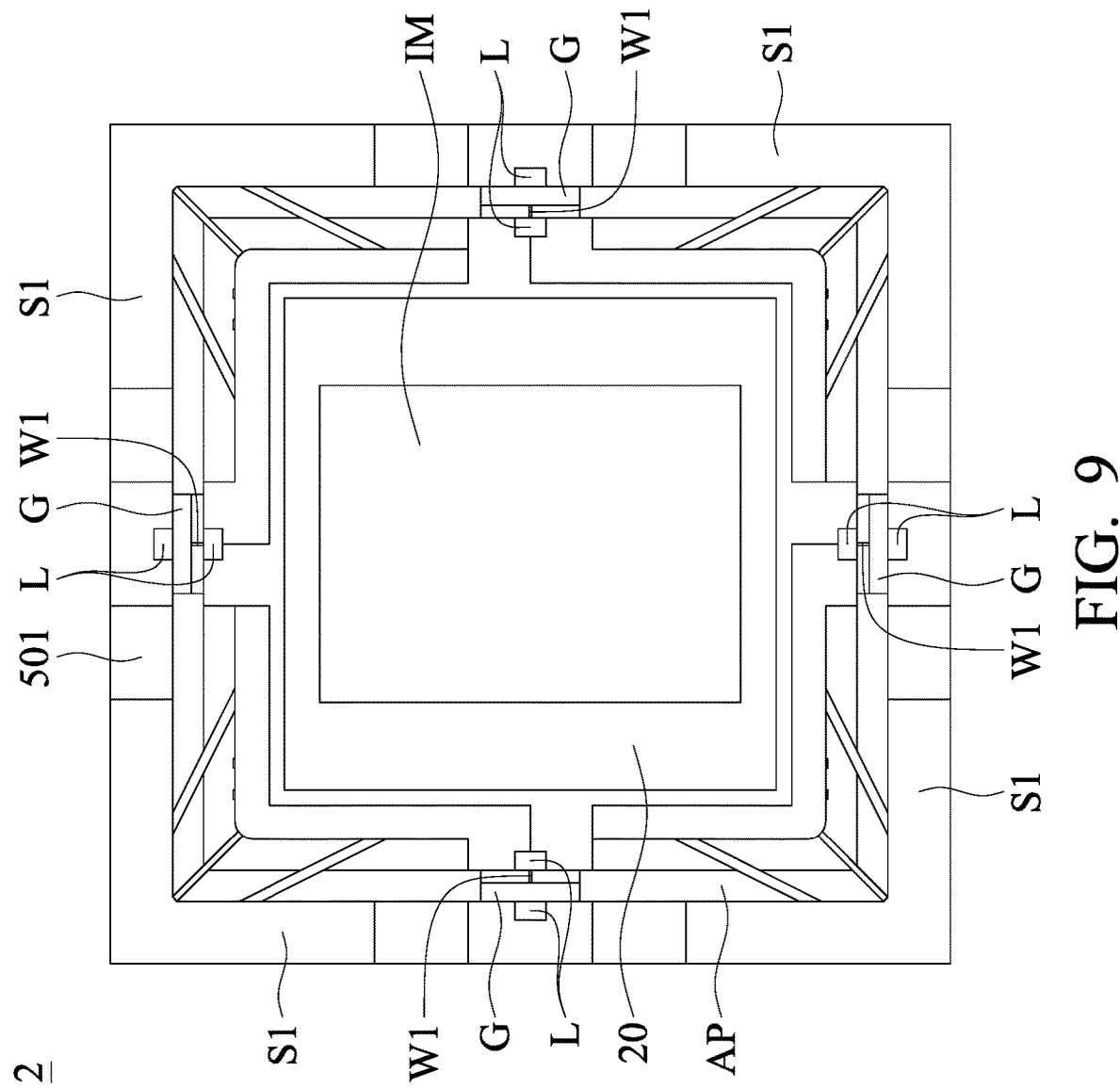
FIG. 9 is a bottom plan view diagram of the camera module in FIG. 8.
Figure 10:
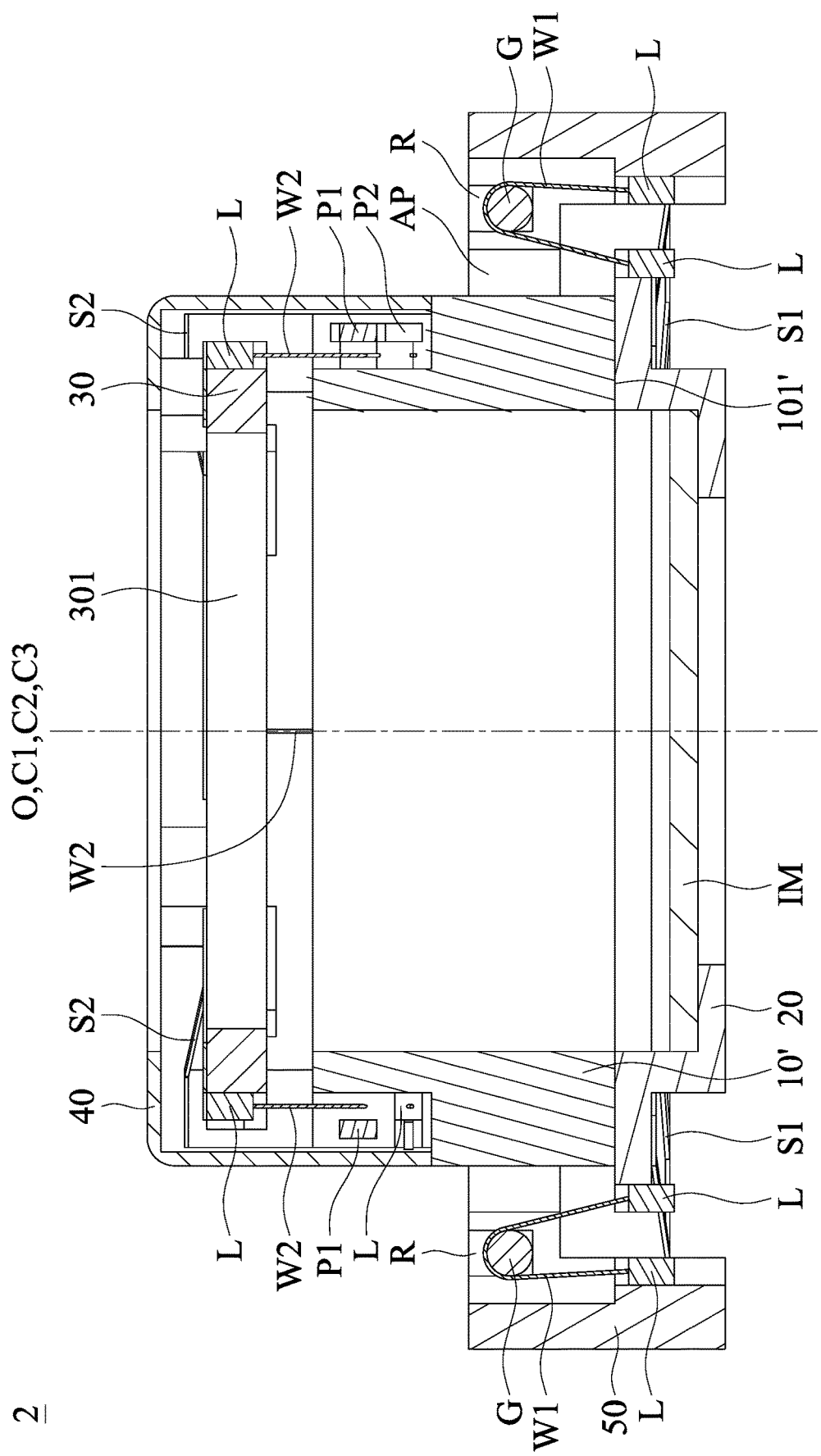
FIG. 10 is a sectional view diagram taken along line B-B in FIG. 8.

Referring to FIGS. 8-10, a lower surface 501 of the frame 50, such as the one affixed to a casing of an electronic device J, is connected to the bottom 20 via the first elastic elements S1, and the bottom 20 is affixed to a lower surface 101' of the base 10. The base 10' and the bottom 20 are surrounded by the frame 50, and a gap AP is formed between the frame 50 and the base 10'. FIG. 10 is a sectional view diagram taken along line B-B in FIG. 8, the first biasing elements W1 movably connect to the bottom 20 and the frame 50 via the conductive blocks L respectively affixed to the bottom 20 and the frame 50. Thus, when applying driving signals to the first biasing elements W1, the bottom 20 affixed to the base 10' (and the image sensor IM disposed on the bottom) and the holder 30 located on the base 10' (and the optical lens held by the holder 30) move together in the direction of a third central axis C3 of the frame 50 relative to the frame 50, or move together relative to the third central axis C3 with an angular displacement, for auto-focusing or optical image stabilization.

Figure 11:
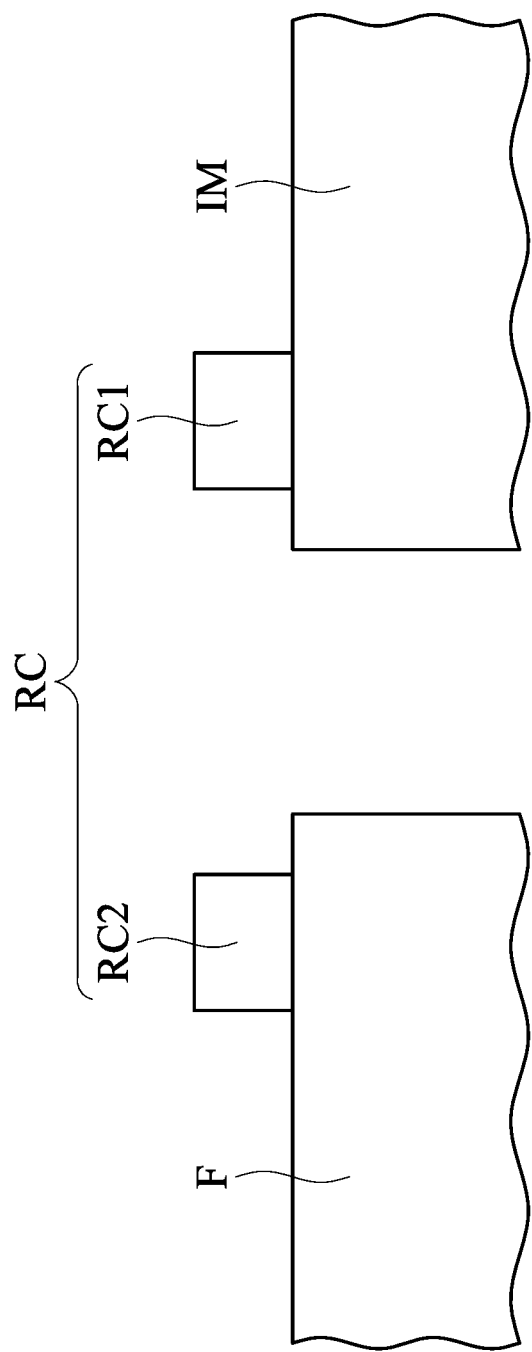
FIG. 11 is a schematic diagram of an optical transceiver assembly is arranged on a circuit board and the image sensor.

FIG. 11 is a schematic diagram of an optical transceiver assembly RC that is arranged on a circuit board F and the image sensor IM. It should be noted that an optical signal can be bi-directionally transmitted through the optical transceiver assembly RC between the image sensor IM in the foregoing embodiments and the circuit board F (e.g., a flexible printed circuit board, FPCB) disposed in an electronic device J. The circuit board F, for example, may be provided on the base 10 or the frame 50, or may be affixed to a casing of the electronic device J. The optical transceiver assembly RC includes a first optical coupling element RC1 and a second optical coupling element RC2 disposed on the image sensor IM and the circuit board F, respectively. When an image is acquired by the image sensor IM, the optical transceiver assembly RC will transmit the image information to the circuit board F in the form of optical signals, so that there is no need to set an additional physical wire to achieve signal transmission, thereby saving space.

In summary, a camera module and a method for controlling the camera module are provided. The camera module comprises a holder for holding an optical lens, a base, an image sensor and at least one first biasing element. The holder is disposed on the base, and the bottom carries the image sensor and is connected to the base via the first biasing element. When the length variation of the first biasing element occurs, the bottom and the image sensor move relative to the base in the direction of a first central axis of the base, or a second central axis of the bottom has an angular displacement relative to the first central axis. Therefore, by effecting various changes to the posture of the bottom, an optical shaking compensation can be accomplished.

In addition, the camera module further comprises at least a second biasing element disposed on the base and connected to the base and the holder. When the second biasing element forces the holder to move by the length variation thereof, the holder and the optical lens move relative to the base in a direction that is substantially parallel to the first central axis, or the optical axis of the optical lens has an angular displacement relative to the first central axis, so that the functions of optical focus or optical shaking compensation can be accomplished.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A camera module, for driving an optical element, comprising:
    a holder, configured to support an optical element which has an optical axis;
    an image sensor;
    a first biasing element, configured to force the image sensor to move relative to the holder;
    a base, wherein the holder is disposed on the base, and the base has an accommodating recess on the bottom of the base;
    a bottom plate, located in the accommodating recess and supporting the image sensor, wherein the first biasing element is connected to the bottom plate and the base; and
    a guiding member disposed in a groove of the base, wherein the groove is located adjacent to an edge of the base, and the first biasing element passes around the guiding member to connect the bottom plate to the base.

2. The camera module as claimed in claim 1, wherein the holder is movable relative to the base, and the base covers the first biasing element when viewed from an optical axis direction.

3. The camera module as claimed in claim 2, wherein the first biasing element is disposed around the guiding member and has a U-shaped structure.

4. The camera module as claimed in claim 3, wherein an opening of the U-shaped structure of the first biasing element is toward a light exit end of the camera module.

5. The camera module as claimed in claim 1, wherein the base and the bottom plate are disposed on the same side of the holder, wherein the base is connected to the holder, the bottom plate supports the image sensor, and when viewed from an optical axis direction, the base at least partially overlaps the bottom plate.

6. The camera module as claimed in claim 5, further comprising a first elastic element and a second elastic element connected to the base and the bottom plate, respectively, wherein the first elastic element elastically connects the holder to the base, and the first elastic element and the second elastic element at least partially overlap when viewed in the optical axis direction.

7. The camera module as claimed in claim 1, further comprising:
a plurality of first biasing elements, surrounding the holder and connected to the base and the image sensor;
wherein the holder is movably connected to the base.

8. The camera module as claimed in claim 7, further comprising a second biasing element located on a lateral side of the base, wherein the second biasing element connects the holder to the base.

9. The camera module as claimed in claim 8, further comprising a plurality of second biasing elements surrounding the holder and connected to the holder and the base.

10. The camera module as claimed in claim 9, wherein the first biasing elements constitute a first biasing assembly, the second biasing elements constitute a second biasing assembly, and when viewed from an optical axis direction, the second biasing assembly is closer to the holder than the first biasing assembly.

11. The camera module as claimed in claim 1, wherein the groove is on an upper surface of the base, wherein the upper surface faces the holder.

12. The camera module as claimed in claim 1, further comprising two conductive blocks, wherein one conductive block is affixed to the bottom plate and one conductive block is affixed to the base, and the two conductive blocks are electrically connected to two ends of the first biasing element.

13. The camera module as claimed in claim 1, wherein the first biasing element is a shape memory alloy (SMA) wire, and when a driving signal is applied to the SMA wire, the SMA wire forces the image sensor to move in the accommodating recess relative to the holder.

14. A camera module, for driving an optical element, comprising:
a holder, configured to support an optical element which has an optical axis;
an image sensor;
a first biasing element, configured to force the image sensor to move relative to the holder;
a base, wherein the holder is disposed on the base, and the base has an accommodating recess on the bottom of the base; and
a bottom plate, located in the accommodating recess and supporting the image sensor, wherein the first biasing element is connected to the bottom plate and the base;
wherein the first biasing element has a first end and a second end which are respectively connected to the bottom plate and the base, wherein the first end is closer to the holder and the optical axis than the second end.

15. A camera module, for driving an optical element, comprising:
a holder, configured to support an optical element which has an optical axis;
an image sensor;
a first biasing element, configured to force the image sensor to move relative to the holder;
a base, wherein the holder is disposed on the base, and the base has an accommodating recess on the bottom of the base;
a bottom plate, located in the accommodating recess and supporting the image sensor, wherein the first biasing element is connected to the bottom plate and the base; and
a first elastic element disposed on the bottom of the base, wherein the first elastic element connects a lower surface of the bottom plate to a lower surface of the base.

16. The camera module as claimed in claim 15, further comprising:
a second biasing element, located on a lateral side of the base, wherein the second biasing element connects the holder to the base and is configured to drive the holder to move relative to the image sensor; and
a second elastic element, disposed on an upper side of the holder, wherein the second elastic element connects an upper surface of the holder to the base.

17. The camera module as claimed in claim 16, wherein the first elastic element is on the opposite of the base with the second elastic element;
wherein the first elastic element is configured to position the bottom plate at a plate initial position with respect to the base, and the second elastic element is configured to position the holder at a holder initial position with respect to the base.

* * * * *